United States Patent

[11] 3,543,978

[72] Inventor Antoine Feillet
     Assevent, France
[21] Appl. No. 779,900
[22] Filed Nov. 29, 1968
[45] Patented Dec. 1, 1970
[73] Assignee Boussois Souchon Neuvesel
     Paris, France
[32] Priority Dec. 12, 1967
[33] France
[31] No. 131,906

[54] METHOD AND DEVICE FOR CUTTING SHEETS OF GLASS
     16 Claims, 20 Drawing Figs.
[52] U.S. Cl. ............................................. 225/2;
     33/32; 83/7, 83/10; 225/96.5
[51] Int. Cl. ............................................. B26f 3/00
[50] Field of Search ............................................. 225/2, 96.5;
     33/32, 41, 45; 83/7, 10, 11

[56] References Cited
     UNITED STATES PATENTS
     1,054,962  3/1913  Smith et al. ............ 83/10
     2,948,991  8/1960  Walters et al. ............ 225/96.5
     3,190,518  6/1965  Insolio ............ 225/2X
     3,286,893  11/1966  Zellers, Jr. ............ 225/2

Primary Examiner—Frank T. Yost
Attorney—Young & Thompson

ABSTRACT: A process and a device for cutting glass into sheets in order to obtain rectangular panes of commercial dimensions and comprising the preparation of a marking layout by means of an electronic computer which receives data relating to customers' specifications. According to the process, an automatic marking operation is carried out on each sheet of glass in accordance with a complete T-layout in which the T crossbars are parallel either to one or the other of two orthogonal directions, said marking operation being carried out continuously by displacement of the glass sheet in one of said directions and correlative incision of all the lines which are parallel to said direction followed by displacement of the same sheet in the orthogonal direction and correlative incision of all the lines which are parallel to said second direction followed by cracking of the glass which has thus been completely incised. The device comprises two traveling gantries adapted to carry the marking-tool units and disposed above two sections of a glass conveyor which extend in directions at right angles to each other and a direction-changing table which serves to convey the sheets to be cut along two orthogonal directions.

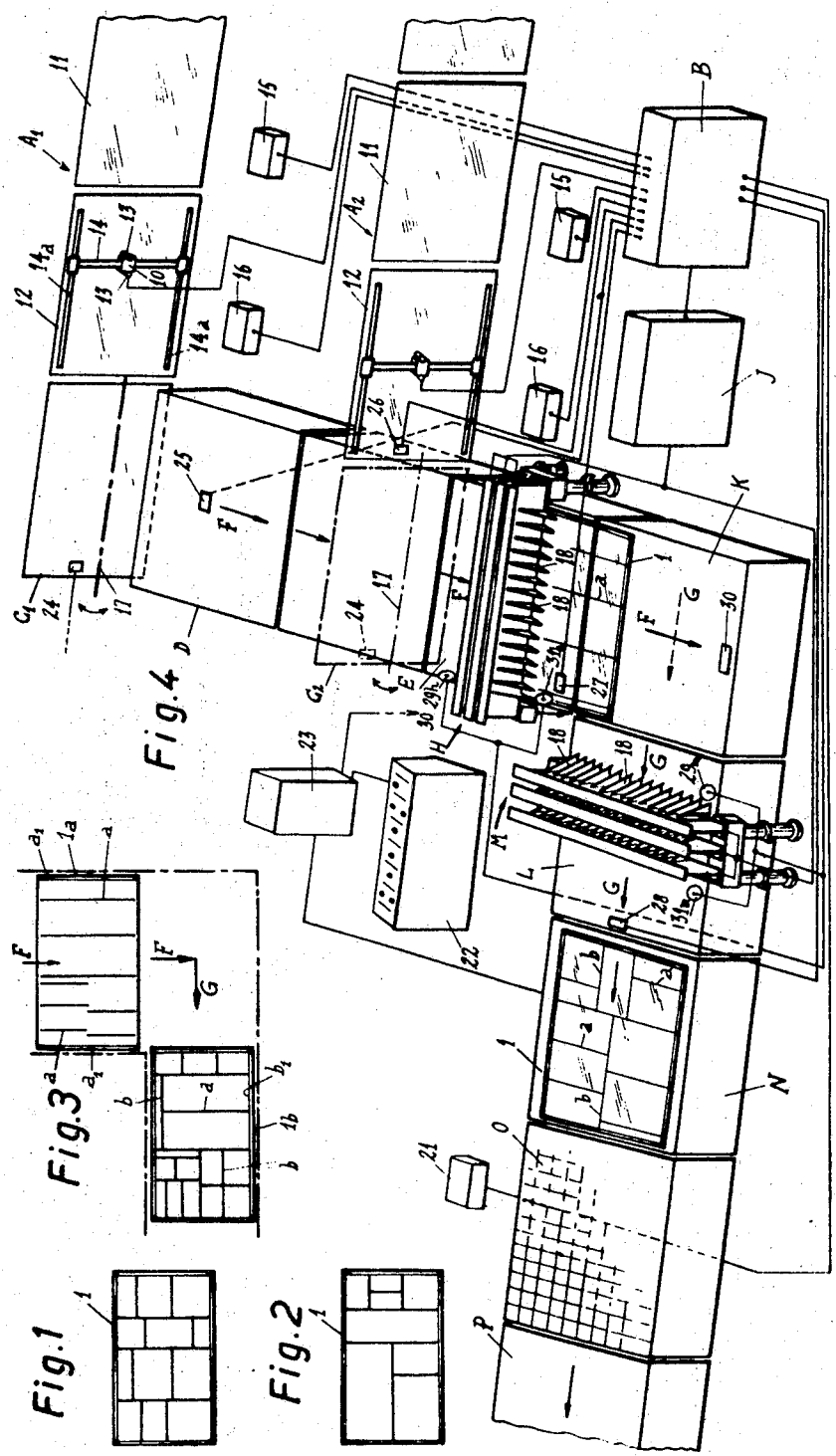

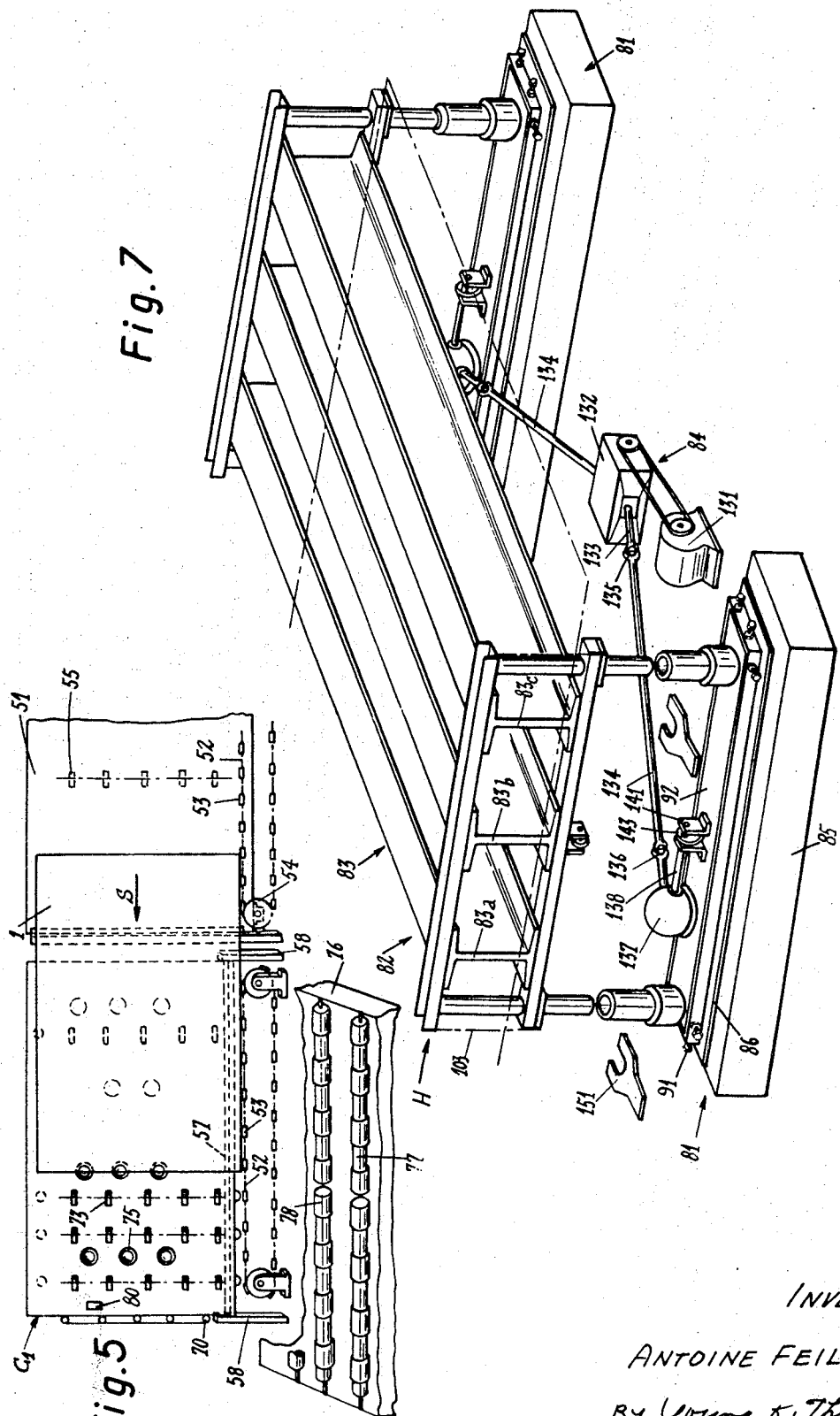

INVENTOR
ANTOINE FEILLET
BY Young & Thompson
ATTYS.

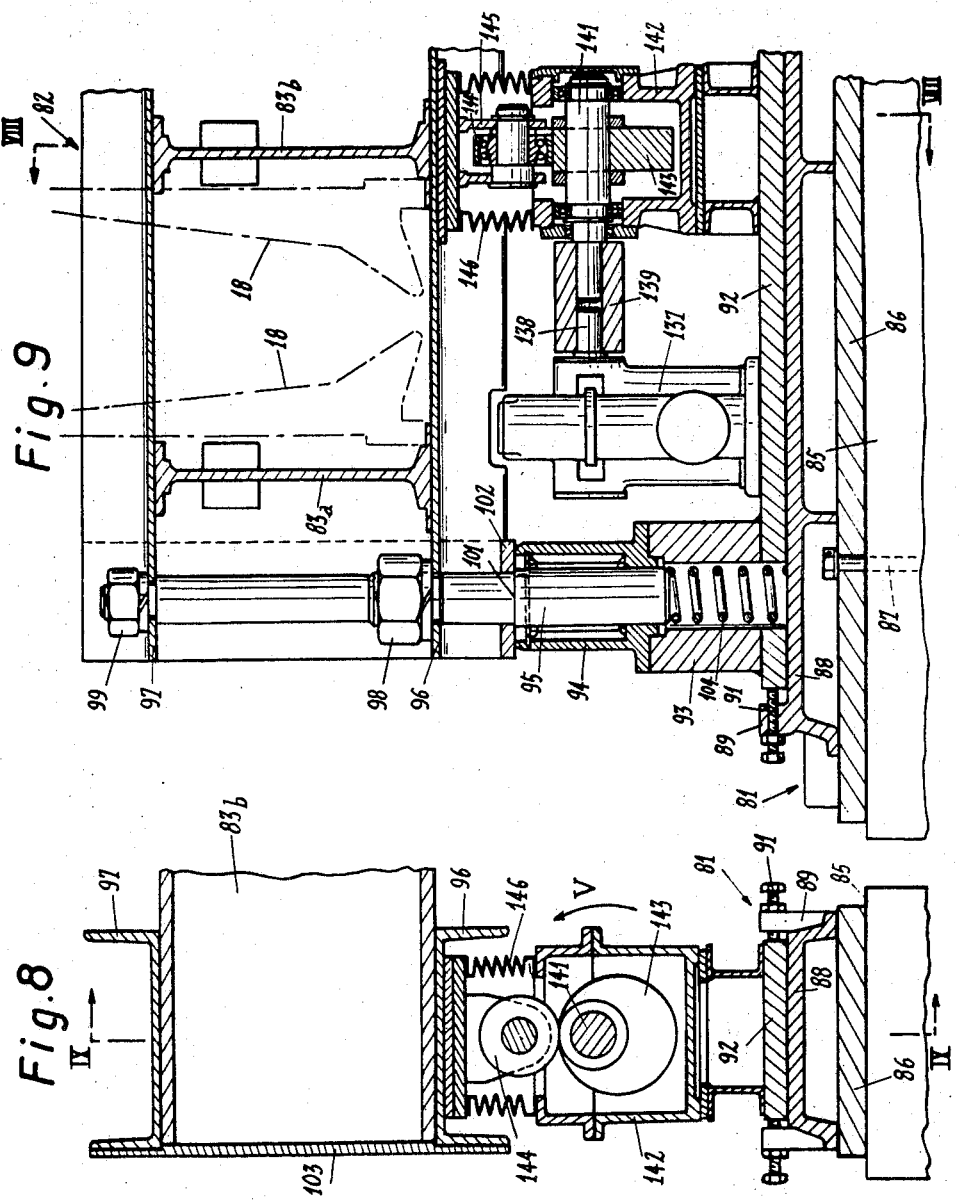

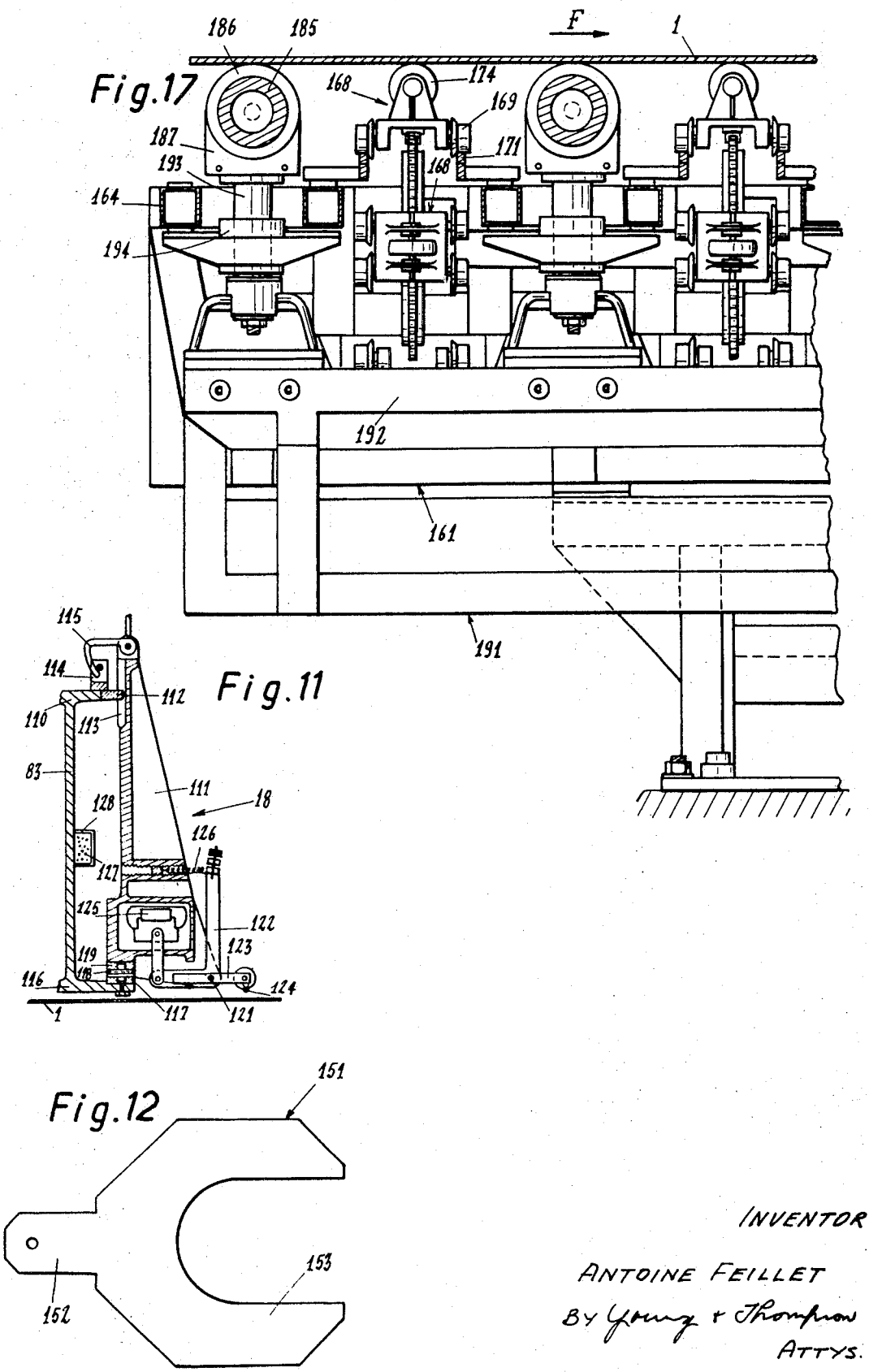

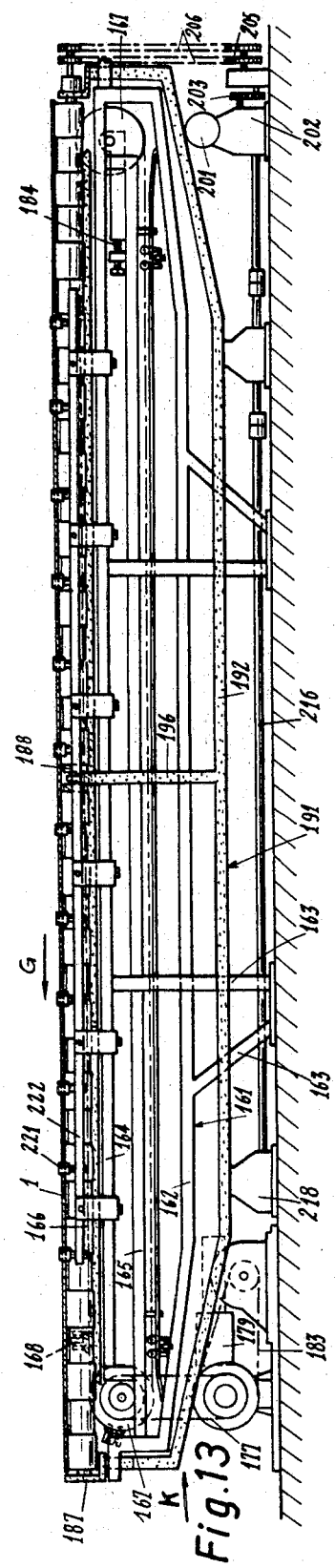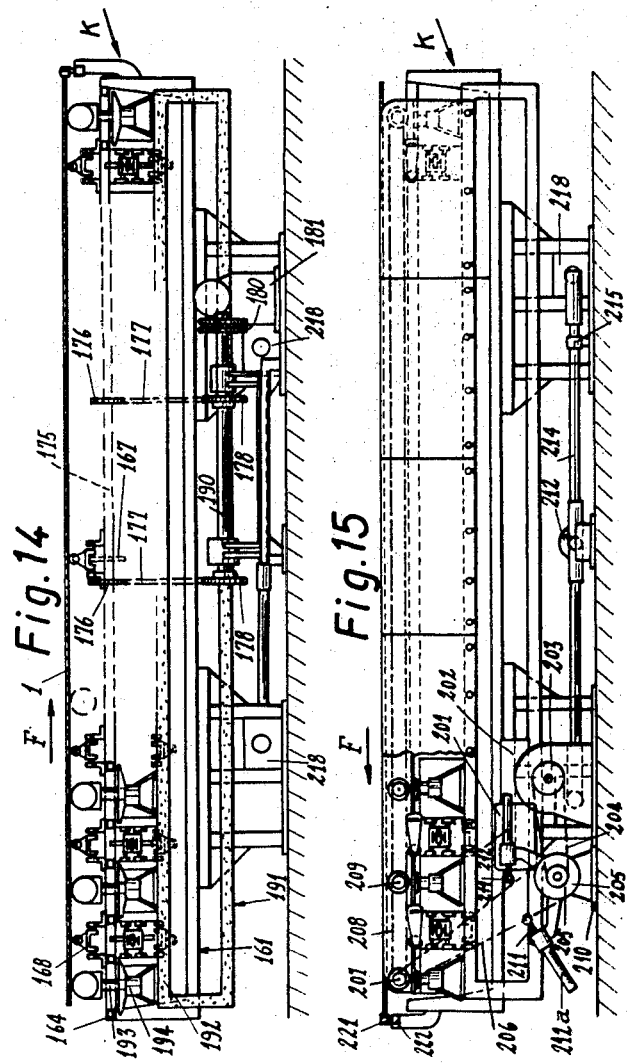

METHOD AND DEVICE FOR CUTTING SHEETS OF GLASS

The present invention relates to a method and a device for cutting sheets of glass into a predetermined number of plates which must necessarily comply with commercial requirements in respect of both quality and dimensions.

The term "glass cutting" as employed in this specification is understood to refer to a complex process which comprises a set of separate operations of two kinds: on the one hand the so-called "marking" operations which consists in making incisions in the surface of the glass sheet by means of an abrasive tool, incipient cracks being thus formed by the lines which are marked in the glass; on the other hand, the glass-splitting or so-called "cracking" operations which consist in separating the sheet into two parts on each side of the marking line.

Marking of a glass sheet of large size (or glass plate) is carried out by means of rectilineal incisions which are parallel to two rectangular directions and usually parallel to the edges of the plate. In the case in which some lines do not extend from one edge of the plate to the other, a so-called T-marking layout is obtained.

The marking layout which is adopted in each particular case is dependent in the first place on customers' specifications but is largely influenced by blemishes existing in the glass which is being marked, the arrangement finally adopted being necessarily such as to permit maximum utilization of the surface of the glass.

The process and device for cutting glass which are contemplated by the present invention entail automatic T-marking of the glass sheet.

T-marking of glass sheets was originally performed by hand, in some cases with the aid of a traveling gantry which carries the marking tools, said tools being either lifted or lowered at will by the operator.

An automatic marking operation was subsequently proposed and was usually performed in several passes, each pass being followed by a cracking operation.

In particular, and in accordance with a first known method of limited T-cutting—that is to say in which the crossbars of the T's are parallel only to a single direction—the glass plates are transferred to a primary conveyor on which each plate is incised successively along lines formed from edge to edge at right angles to the direction of displacement of the glass plate; the sheet is split mechanically into primary sheets along said incisions; the primary sheets are automatically delivered onto a number of secondary conveyors placed at right angles to the primary conveyor, then incised from edge-to-edge parallel to the direction of displacement of the glass on the main conveyor.

In another method of limited T-cutting, the glass plates follow the same paths, are subjected to the same marking and cracking operations as in the previous method but the cutting layout is established by an electronic computer which takes into account both flaws in the glass and customers' specifications.

Flaws in the glass are examined and marked by hand on the primary conveyor. An electronic apparatus records said flaws and supplies an indication of their nature and location to the computer; the glass is then marked transversely from edge to edge by means of a tool which moves parallel to the axis of a gantry placed transversely with respect to the glass and which is displaced by the gantry at the level of the line to be incised, suitable positioning of the gantry with respect to the glass being controlled by the computer which has established the cutting layout. After being marked, the glass is split successively and automatically into primary sheets. The computer then initiates the operation of an apparatus which marks on said primary sheets lines constituting the longitudinal marks along which the sheets are subsequently to be cracked. The primary sheets are disposed on secondary conveyors at right angles to the first conveyor; at the feed end of each conveyor, an electronic reader reads off the longitudinal marks on each sheet; said primary sheets come to a stop beneath a marking gantry which is parallel to the axis of the secondary conveyor; this gantry carries a series of closely spaced tools; the reader initiates the downward motion of the marking tools corresponding to the marks which it has read and the gantry moves over the glass while incising this latter from edge to edge. The primary sheets are then automatically cracked.

The use of automatic machines represents a considerable step forward in this field and makes it possible to treat large areas of glass in a minimum period of time; the marking outlays which are determined by means of computers are better than those which can be devised by a specialist but the large number of successive operations of marking and cracking call for installations which are both highly complex and costly as a result of the extensive arrangement of conveyors and the large number of marking machines which are necessary. Furthermore, by reason of the very fact that only a limited T-cutting operation is performed, the surface of the glass is not utilized to the maximum extent. Installations of this type are therefore not particularly economical except for the purpose of mass production of large quantities of identical sheets of glass.

Moreover, in all systems comprising marking gantries which are guided by rails and intended to move above the glass sheet, the play which inevitably arises in mechanical devices is highly detrimental to accuracy of marking. Similarly, by reason of the weight of the traveling gantries which carry the marking tools, the displacement of said gantries is necessarily slow, thus limiting the rate of production.

Another known automatic installation comprises conveyors, tables on which marking is carried out, and cracking tables. The glass plates are brought successively onto a first marking table and come to a stop on this latter; a tool makes incisions in each plate and from edge to edge in the transverse direction; the plate is split into primary sheets which are discharged successively. The primary sheets are conveyed in a perpendicular direction; those sheets on which no further cutting is to be performed are carried away after a change of direction on a conveyor which moves in the same direction as the feed conveyor; the other sheets are then transferred after a change in direction to a second cutting table on which they stop, are then incised and cracked lengthwise from edge to edge in a process which is similar to that which took place on the first table. The secondary sheets which are no longer to be cut are discharged and those which are to be cut into tertiary sheets pass again onto the first cutting table after having changed direction and so on in sequence.

The operations performed by the machine are controlled either wholly or in part by a computer which, in addition, determines the cutting layout in such a manner as to take the customers' specifications into account while at the same time ensuring elimination of unacceptable defects.

In an automatic installation of this type, the edge-to-edge marking operations followed by cracking are carried out on only two cutting tables on which the glass stops. In the case of a layout of even slight complexity, the cutting of a glass plate therefore entails a very large number of movements of transfer and stopping on tables. Inasmuch as they are necessarily designed to process glass plates, marking and cutting systems of the type mentioned are correspondingly lower in economic performance as the surface area of the elements derived from the division of the plate becomes smaller; furthermore, when cutting each plate, increasing numbers of elements are set aside to await processing by reason of the fact that the two cutting tables cannot process more than two at the same time. Temporary storage is consequently made necessary; the installation is cumbersome and complex in its operation. Moreover, the capacities of the electronic computer are not utilized to the fullest extent, with the result that the installation does not achieve optimum productivity in respect of hourly output. A further shortcoming lies in the fact that, since the output is lower as the complexity of the cutting layout is greater, it can be considered that there is a certain degree of incompatibility between the mechanical means provided and the utilization of a computer.

It is precisely the aim of the present invention to overcome disadvantages of the type referred to in the foregoing and in particular to permit marking at high speed with a high degree of accuracy and in such a manner as to ensure optimization of the program which is established by the computer.

In accordance with the invention, the process for cutting glass into sheets in order to obtain rectangular panes of commercial dimensions and comprising the preparation of a marking layout by means of an electronic computer which receives data relating to customers' specifications is characterized in that an automatic marking operation is carried out on each sheet of glass in accordance with a complete T-layout in which the T crossbars are parallel either to one or the other of two orthogonal directions, said marking operation being carried out continuously by displacement of the glass sheet in one of said directions and correlative incision of all the lines which are parallel to said direction followed by displacement of the same sheet in the orthogonal direction and correlative incision of all the lines which are parallel to said second direction, followed by cracking of the glass which has thus been completely incised.

The complete T-layout as thus provided by the invention differs from limited T-marking in which the crossbars of the T's formed by the incision lines are parallel only to one and the same direction.

The execution of the continuous marking operation, the direction of translational motion of the glass sheet which is turned through 90° between the two marking operations results in substantial advantages as will become apparent hereinafter.

Also in accordance with the invention, the device for cutting glass into sheets in order to obtain rectangular panes of commercial dimensions and comprising a conveyor for the glass sheets, a set of marking tools disposed above said conveyor and controlled selectively by an electronic computer which receives data relating to the cutting operation and establishes the cutting layout, and a system for cracking the glass, is characterized in that it comprises two stationary gantries adapted to carry the marking-tool units and disposed above two sections of the conveyor which extend in directions at right angles to each other, a direction-changing table which serves to convey the glass sheets at right angles and arranged between the two marking gantries and that the glass-cracking system is disposed downstream of the second cutting gantry relative to the direction of displacement of the glass sheets.

In an advantageous arrangement of the invention, the marking gantry comprises at least one beam disposed above the conveyor and adapted to extend at right angles thereto, said beam being adjustable for height and adapted to carry at least one row of marking-tool units. As a preferred feature, the marking-tool units are uniformly spaced along the beam with a constant pitch and each tool unit is adapted to carry a glass-incising component and electromagnetic means for initiating the operation of said component.

In a preferred arrangement of the invention, the marking gantry comprises a plurality of parallel tool-carrier beams each adapted to carry a series of marking-tool units, said beams being so arranged as to constitute a rigid box structure which supports vertical guide columns, said columns being slidably mounted within sleeves mounted on a stationary base disposed along each side of the conveyor and means are provided for adjusting the height of the box structure relative to the base, said means consisting of a lifting and lowering device which is capable of lifting the box structure and a set of removable packing-pieces which can be interposed between said box structure and the base.

Furthermore, according to an advantageous feature of the invention, the direction-changing table comprises a system of driving rollers having axes located at right angles to the direction of forward motion of the glass and rows of carrying-wheels having parallel axes and placed between the driving rollers, said wheels being mounted on carriages which are capable of displacement in translational motion parallel to the axes of said rollers, means being additionally provided for lowering the set of driving rollers and initiating the translational motion of the carriages in order to change the direction of motion of the glass plate through 90°. Preferably, the driving rollers which are assumed to be in the top position and the carrying-wheels are located in a same common tangent plane which defines the level of the glass plate, with the result that said level does not vary during the plate direction changing operation.

Further properties of the invention will become apparent from the description which follows hereinafter, with particular regard to the arrangement of certain electromechanical or electronic control devices.

In the accompanying drawings which are given by way of nonlimitative example,

FIGS. 1 and 2 are simplified plan diagrams showing two types of T-marking operation;

FIG. 3 is a plan diagram which illustrates the process according to the invention;

FIG. 4 is a simplified perspective diagram of an automatic cutting installation according to the invention;

FIG. 5 is a diagrammatic view in perspective showing the junction of an inspection bay with the conveyor;

FIG. 7 is a perspective diagram of a marking gantry;

FIG. 8 is a sectional view along line VIII–VIII of FIG. 9 showing the end of the aforesaid gantry;

FIG. 9 is a sectional view along line IX–IX of FIG. 8;

FIG. 11 is a diagrammatic side view showing a marking tool;

FIG. 12 is a plan view of a packing-piece;

FIG. 13 is a view in front elevation showing one form of construction of the direction-changing table;

FIG. 14 is a sectional view of the aforesaid table and taken along a plane at right angles to the plane of FIG. 13;

FIG. 15 is a side view which is similar to FIG. 14 and showing the table casing, a part of which has been broken away near one end thereof;

FIG. 17 shows a portion of FIG. 14 on the same scale as FIG. 16;

Figure 6:
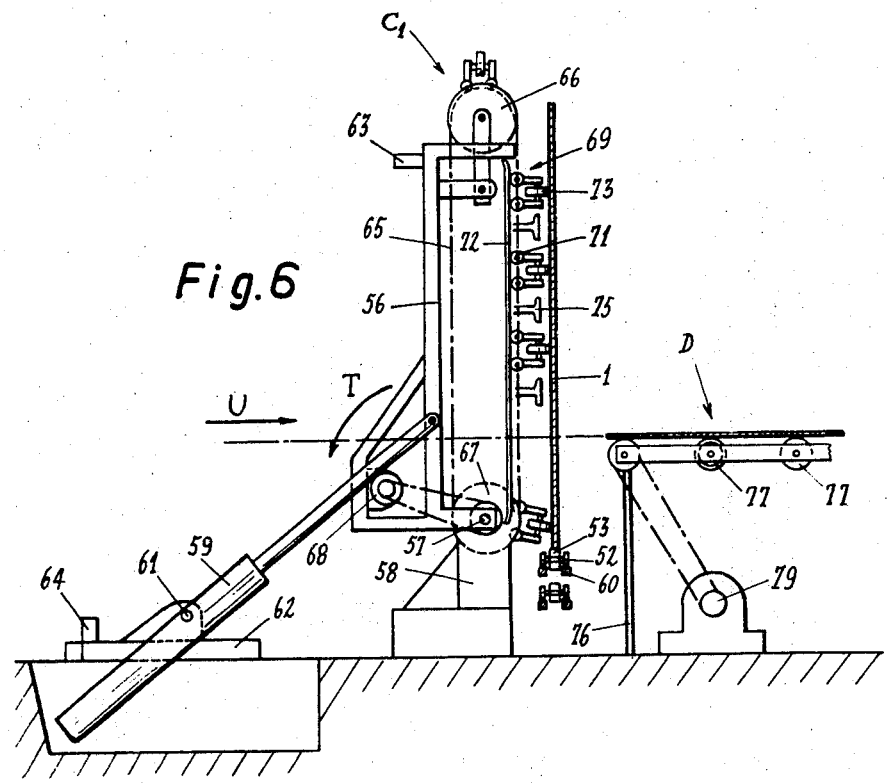
FIG. 6 is a view in side elevation showing a tilting table.

Referring now to FIG. 1 of the accompanying drawings, there is shown at 1 a glass plate on which limited T-marking has been carried out. On said plate, those incision marks which are oriented parallel to the two sides are such that the T crossbars which are located at the point of intersection of two rectangular marking lines extend parallel only to one direction, namely the direction of the short sides of the plate.

On the contrary, in the diagram of FIG. 2, the set of marking lines results in T crossbars which, in some cases, are parallel to the short sides and, in other cases, are parallel to the long sides of the plate 1. The complete T-marking network thus formed has the advantage of limiting the area of wasted glass resulting from any flaws which may be present in the plate.

FIG. 3 illustrates the method of execution of the complete T-marking operation which is contemplated by the method according to the invention. In this method, the plate 1 is first provided with all the marking lines a which are parallel to one side of the plate, namely the short side in the example shown (state 1a).

When this first series of lines has been marked the plate 1 is provided with the set of lines b which are parallel to the other side of said plate and which are consequently located at right angles to the above-mentioned lines a (state 1b).

During the first marking stage, the plate 1 has also been provided with the edge lines $a_1$ which are intended to eliminate edge defects in the glass. Similarly, the edge lines $b_1$ are marked on the plate during the second marking stage.

The system of lines $a$ and $b$ constitutes a complete T-marking of the plate 1.

The operations $T_a$ and $T_b$ involved in marking respectively the lines $a$ and $b$ are carried out continuously by means of a set of stationary marking-tool units beneath which the glass plate 1 is intended to be displaced, this displacement being carried out in the first place in a direction F which is parallel to the lines $a$, then in a direction G which is at right angles to the preceding and parallel to the lines $b$.

These consecutive movements of displacement in two directions at right angles are preferably obtained by means of successive conveyors which produce action respectively in the directions F and G, said conveyors being separated by a direction-changing table which makes it possible to reduce the rate of displacement of the glass plate 1 in the direction F to zero and to impart thereto a new rate of displacement in the direction G. Examples of construction both of the marking means and of the means for displacing the plate 1 will be described hereinafter.

The complete T-marking network thus formed is advantageously determined by a data-processing machine such as a digital computer as a function on the one hand of the customer's specifications and on the other hand of localizations of flaws which are detected on the glass plate considered.

Once the complete T-marking operation has been effected, the operation which consists in cracking the plate along the lines $a$ and $b$ which have thus been marked is then carried out. In the same manner as the marking operation, the cracking process can be carried out automatically but, in accordance with a particular feature of the invention, is only carried out after the entire marking operation has been completed.

As will be readily understood, the invention would also apply to the case in which the glass sheet is not presented in the form of a plate 1 but in the form of a continuous ribbon produced, for example, by an installation for the manufacture of floated glass.

In this case, before proceeding to mark the entire system of lines $a$ and lines $b$, transverse marking and cracking of the ribbon would be carried out along lines from edge to edge in order to divide said ribbon into plates 1, the distance between said lines having been determined by the computer as a function of the position of any blemishes located on the ribbon and also in accordance with customers' specifications.

Referring to FIG. 4, there will now be briefly described an installation for the automatic execution of the above-mentioned process on separate glass plates 1. There will be described below by way of example one detailed form of construction of a number of elements of the installation under consideration.

The installation which is contemplated in FIGS. 4 and 5 essentially comprises two parallel bays A1, A2, for the inspection of plates 1. Said bays are arranged in identical manner and each comprise a station 11 provided with a table for receiving plates 1 and enabling an operator to inspect and mark any blemishes found on said plates 1. The station 11 is followed by a station 12 for transmitting data relating to defects to a digital computer B or to a similar data-processing machine which ensures automatic control of the marking installation. The station 12 also comprises a table on which is mounted a rule 14 located in a vertical plane and adapted to slide in a direction parallel to its axis along two horizontal rails 14a which are secured to the table. There is slidably mounted on the rule 14 a moving carriage 10, the displacement of which is controlled by an electric motor, the displacement of the rule 14 relative to the rails 14a being controlled by another motor which has not been shown in the FIG. The carriage 10 is adapted to carry on each side of the rule 14 an an index 13 (such as a luminous spot generator) which serves to indicate the position of the defect in the surface of the glass plate 1.

The carriage 10 is connected to the digital computer B by means of a transmission system whereby the coordinates of said carriage as indicated along two orthogonal axes which are parallel to the edges of the plate are recorded in the storage device of the computer.

For example, in order to indicate said coordinates, the carriage 10 can be displaced in front of two rules which are pierced by holes in accordance with a binary code and which, as a result of reading of incorporated light beams, can transmit signals which are recorded by the computer B. The carriage 10 can also be provided with a manual keyboard which has not been illustrated and indicates the nature of defects to the computer B in decimal code.

The bays A1 and A2 are each provided in addition with a manual keyboard 15 which transmits the general characteristics of the plates to the computer B in decimal code and which, in the event that the carriage 10 is not employed, can also transmit to said computer indications relating to the position and nature of the defects which are located. A printing machine 16 which is connected to one of the outputs of the computer B supplies the indication of the marking layout which has been established by said computer. This enables the operator to mark on the plate the serial number of the order or orders corresponding to the marking operation to be performed. The station 12 is followed by a tilting table $C_1$, $C_2$ respectively, each table being provided with a plate-reception surface which is pivoted about a horizontal axis 17. Said tables $C_1$ and $C_2$ will be briefly described hereinafter together with the handling means which serve to convey the glass plates 1 automatically along the stations 11 and 12 and to transfer them onto the tables $C_1$ or $C_2$.

A roller-type conveyor D or like handling means is arranged in the line of extension of the table $C_1$ which is assumed to be horizontal. Said conveyor effects the displacement of the plate 1 horizontally in a direction F which is parallel to one of its edges and preferably to the short sides thereof.

The conveyor D is followed by the tilting table $C_2$, on the downstream side of which is located in the direction of the arrow F a second conveyor E which may be of similar type, for example, to the conveyor D. There is mounted above the conveyor E a marking gantry H which extends at right angles to the direction of the arrow F and is adapted to carry a set of uniformly spaced marking-tool units 18, each tool unit being capable when actuated of drawing a line continuously on the surface of the glass plate 1. The different marking-tool units 18 are connected individually to a control cubicle J which in turn received instructions from the computer B.

The conveyor E is followed by a direction-changing table K which is so arranged as to bring the plate 1 in the direction of the arrow F up to a stationary position which is followed by the departure of said plate in the direction of the arrow G at right angles to F. In the direction G, the table K is followed by a second conveyor L which is similar to the conveyor E and which effects the displacement of the glass plates in the direction G. There is mounted above the conveyor L a second marking gantry M which is similar to the gantry H and the tool units 18 of which are also connected individually to the control cubicle J.

The conveyor L is followed by a further conveyor N which is similar to the preceding and discharges onto a cracking table on which the plate 1 is subjected to cracking.

Provision is made beyond the table O for another conveyor P which serves to carry away cut sheets of glass. Provision is made at the cracking station for a keyboard system 21 which is connected to the digital computer and enables the operator to supply information to said computer in regard to any breakage which may have occurred during the cracking operation.

The installation also comprises a manual control desk 22 enabling an operator to control selectively and at will the operation and running speed of the different conveyors by means of a relay cubicle 23.

The electromechanical system for controlling the installation is provided among other features and on each table $C_1$, $C_2$ with a limit contact 24 for stopping the glass plate 1 which comes from the station 12.

There is also placed on the conveyor D a feeler 25 which is connected to the digital computer B and which indicates to this latter whether the glass plate to be subjected to the marking operation comes from the bay $A_1$, in which case the feeler 25 is actuated, or whether said plate comes on the contrary from the bay $A_2$, in which case the plate is then moved downstream of the feeler 25. In addition, a second feeler 26 which is also connected to the computer B serves to identify the plates derived from the bay $A_2$.

Feelers 27 and 28 are also placed respectively on the downstream side of the gantry H relative to the direction of the arrow F and on the downstream side of the gantry M relative to the direction of the arrow G. Said feelers are respectively intended to transmit to the computer B a signal corresponding to completion of marking of the glass plate by the gantry considered. The direction-changing table K also carries a feeler 30 which is actuated by the glass plate 1 when this latter has reached the end of travel in the direction F. The feeler 30 is connected to the cubicle 23 and permits automatic control of the change in the direction of displacement of the plate on the table K.

In order to permit of correlation between the marking orders delivered by the computer B and the position of the glass plate during progression of this latter beneath the gantry H or M, provision is made both on the upstream and downstream side of each gantry H or M for a set of two feeler wheels $29h$, $31h$ or $29m$, $31m$, respectively, each wheel being adapted to drive a rotary coder (not shown in the FIG.) and this latter transmits to the computer B a number of signals which is proportional to the distance of displacement of the plate 1. By virtue of an electronic switching device, the coder $31h$ which is located on the downstream side of the gantry H replaces the coder $29h$ which is located on the upstream side when the front edge of the glass plate has reached the aforesaid coder $31h$. The same applies to the gantry M.

According to one form of construction, the upstream coder $29h$ (or $29m$) is already connected when the front edge of the plate 1 reaches the level of said coder; in accordance with another form of construction, said coder is put into operation by means of a photoelectric cell which is directed towards the conveyor and intended to detect the passage of the front edge of the glass plate in a predetermined position. In consequence, there is never more than one coder which is connected and this is the case during the useful period of displacement of the glass plates beneath the gantry. The coders $29h$, $29m$ and $31h$, $31m$ are arranged, for example, to deliver one pulse for each millimeter of displacement of the plate 1, thereby ensuring high precision in the determination of the position of the plate 1 by the computer B.

In addition, the presence of the feelers 27, 28 makes it possible to supply the computer with accurate information in regard to the end of transfer of a glass plate, thereby avoiding the transfer of all or part of the marking layout onto another plate in the event of any error of measurement in the dimension of the plate.

The installation as thus constructed is preferably adapted to permit of fully automatic operation. However, within the scope of this operation, either a bay $A_1$ or a bay $A_2$ or, on the contrary, both bays simultaneously can be put into service. Furthermore, it is possible to operate the installation by manual control from the desk 22.

In order to satisfy the foregoing conditions and especially in order to provide for fully automatic operation irrespective of the number of bays $A_1$, $A_2$ which are in service, the following basic principles are adopted for the operation:

a. There is only one glass plate 1 being subjected to a marking operation. Consequently, no plate will pass onto the conveyor E of the first cutting gantry H if the previous plate has not moved away from the cutting gantry M of the conveyor L, that is to say if said plate has not arrived on the conveyor N.

b. Priority is given to the glass plates of the table $C_1$. Thus, any plate which has already begun to enter in the vertical position or which has stopped on the tilting table $C_1$ will have priority over plates coming from the bay $A_2$. This results in the following condition: in order that the table $C_2$ should be capable of moving upwards to the top position, it must be ensured that no glass plate has either begun to move onto or stopped on the table $C_1$.

c. The table $C_1$ moves downwards as soon as it is loaded and transfers the plates 1 towards the cutting gantry H. This makes it possible to reduce stopping times as far as possible. In addition, as soon as said table has reached the bottom position, the plate is immediately transferred to the conveyor D even if it should subsequently remain in a standby position if the cutting gantry H is not available.

d. Upward motion of the table $C_1$ as soon as the plate 1 has been discharged onto the conveyor D.

e. Replacement of the direction-changing table K in the position of transfer in the direction of the arrow F as soon as the plate carried thereon has been discharged onto the conveyor L. Thus, the table K will always be in readiness to receive a glass plate which is supplied from the conveyor E.

f. Simultaneous operation of the motors which effect horizontal translational motion. The different motors which have not been shown in the FIG. and carry out the horizontal translational motion on the tables $C_1$, $C_2$ and on the conveyors must not be started up unless the motor which produces translational motion on the conveyor which immediately follows the conveyor under consideration is also in operation.

Thus, the motor of the table $C_1$ must therefore rotate only if the motor of the conveyor D is also in operation.

Similarly, the motor of the conveyor D must rotate only if the motor of the horizontal translation on the table $C_2$ is also in operation.

Finally, it must be possible to start up the motors which ensure translational motion on the table $C_2$ and the conveyor E only on condition that the direction-changing table K is in the position of transfer in the direction of the arrow F as has been indicated earlier in paragraph e.

g. Manual control for transferring glass plates onto the tilting tables $C_1$, $C_2$. After appraisal, the glass plates can be moved onto the tables $C_1$ or $C_2$ only by producing manual action on a pushbutton control box.

The operation of the installation as thus arranged is as follows: the different control data are supplied to the computer B in the form of punched cards. This operation is carried out prior to appraisal of the first glass plate to be cut.

A glass plate is then brought into at least one of the bays $A_1$ or $A_2$. The plate is then inspected at the station 11 so as to record any flaws which make the corresponding portion of the glass unfit for use. These different characteristics of the plate are then transmitted to the computer B by means of the carriages 10 and/or the keyboard 15. These data are of two types:

a. Data which are common to a whole series of glass plates such as, in particular, thickness, appraisal date, date of manufacture, nature of the glass and dimensions. Naturally the dimensions considered are in most cases common to a whole series of treated plates.

b. Specific information relating to the plate to be treated. In this case, a first message relating to systematic defects observed are transmitted by means of the keyboard 15. Messages corresponding to each defect are also transmitted. These messages are constituted either by two digits corresponding to the two coordinates of the defect when this latter can be considered as a point defect or by four digits when the defect concerns an entire zone of the plate. These digits accordingly correspond to the coordinates of the extremities of the ascending diagonal lines of a rectangle which limits the defect zone. Transmission of these coordinates is carried out automatically by reading of the rules as carried out by the carriage 10 on which the indexes 13 are mounted. The dimensions are transmitted to the computer in millimeters.

After receiving all the necessary data, the computer B then establishes the marking layout and messages which are descriptive of the marking layout are transmitted from the computer B in particular into the corresponding bays $A_1$ or $A_2$ by means of typewriters 16, thus enabling operators to mark the order serial numbers on the glass plate in order to permit of subsequent identification of these latter downstream of the cracking station O.

The cutting layout as thus prepared is set aside in readiness for subsequent use. The different layouts constitute a waiting line for each bay $A_1$ or $A_2$ in the chronological order of their appraisal.

As a result of manual control on the part of the operator, a glass plate 1 is then transferred from the bay $A_1$ onto the table $C_1$ or from the bay $A_2$ onto the table $C_2$. The table considered then performs a tilting movement. If the plate 1 is on the table $C_1$, it is taken by the conveyor D and placed if necessary in standby position as indicated earlier, then passes onto the table $C_2$ which is necessarily located in a horizontal position. On the conveyor D, the glass plate has actuated the feeler 25, thus informing the computer B of its presence. If, on the contrary, the plate has been brought onto the table $C_2$, it is the feeler 26 which transmits the corresponding information to the computer B.

In all cases, when the glass plate reaches the conveyor E, the upstream coder $29h$ is actuated and transmits one pulse to the computer B for each millimeter of forward motion of the plate.

Selective operation of the marking-tool units 18 of the gantry H is initiated by the computer as a function of the measurement of forward motion referred to. The tool units are maintained in contact with the plate 1 during the time which is necessary for marking the lines $a$. This controlled operation is carried out from the computer B through the cubicle J which serves as a relay between electronically-maintained contacts within the computer and the receiving components of the marking-tool units 18.

During the forward motion of the glass plate beneath the gantry H. the coder $29h$ is replaced by the coder $31h$ when the front edge of the plate has reached a predetermined position.

On completion of transfer beneath the gantry H, a signal is transmitted to the computer B by the feeler 27; this latter is not essential but provides a means of control over the forward motion of the glass plate. In fact, in the case of defective measurement or in the event that inaccurate information has been transmitted to the computer in regard to the dimension of the glass plate, the feeler 27 makes it impossible to transfer any part of the marking effected by the gantry H to the marking performed subsequently by the gantry M or conversely in the case of the following glass plate.

When the plate has reached the end of its travel on the direction-changing table K. the feeler 30 is energized and the glass plate is then transferred beneath the gantry M by the conveyor L in the direction of the arrow G. During this forward motion, the coders $29m$ and $31m$ perform the same function as the coders $29h$ and $31h$ mentioned above. During the passage of the plate beneath the gantry M, the computer then selectively initiates the operation of the tool units 18 which mark the glass plate along the lines $b$. The computer B is informed of the completion of the marking operation by the feeler 28.

Should either one or a number of glass plates be broken during the cracking operation, it is necessary to correct the operating statistics which are stored in the computer B. In addition, the broken volume or volumes must be returned for control. This is carried out automatically by transmitting a message from the keyboard 21.

By way of indication, the cycles of the different operations which are carried out in sequence in the bays $A_1$ or $A_2$, on the tilting tables $C_1$ or $C_2$, on the different conveyors D, E, on the table K of the conveyors L and N correspond to a cutting rate of one glass plate per minute. At this rate, the speeds of translational motion of the glass plates can preferably be determined as follows:

Vertical translational motion of the glass plates within the bays $A_1$ or $A_2$ and along the tables $C_1$ or $C_2$ when these latter are in the top position: 10 meters per minute.

Horizontal translational motion on the tables $C_1$ and $C_2$ in the bottom position, and on the different conveyors up to and including the conveyor N: 15 meters per minute.

Translational motion on the cracking table: 30 meters per minute.

There will now be described the different subassemblies of the installation which is illustrated in FIG. 4 by providing an explanation of the operation of said subassemblies progressively as this operation takes place. This description will follow the logical order which corresponds to the stations successively encountered by the plate 1 during the cutting operation.

Since the two bays $A_1$ and $A_2$ have the same structure as has already been defined, only the first bay will therefore be described. The stations 11 and 12 each comprise a table 51 which is slightly inclined towards the rear in order to prevent the plate 1 from tilting forwards. A vertical lifting and lowering movement can be imparted to the tables 51 (FIG. 5). There is fixed on the base of each table a plate-displacing system which comprises an endless chain 52 fitted with uniformly spaced cleats 53 on which the bottom edge of the plate 1 is supported. The chains 52 are mounted between sprockets 54 which can be driven in rotation by motors (not shown in the FIG.).

The table 51 is provided with a series of bearing wheels 55, the axes of which are parallel to the line of greatest slope and are level with the plane of said table. The wheels 55 permit the displacement of the plate 1 along the bay considered and in a direction parallel to its axis as shown by the arrow S.

In the top position thereof, the tilting table $C_1$ or $C_2$ is placed in alignment with the table 51 of the station 12 when said table 51 has been moved to a suitable height and comprises, as shown in FIG. 6, a frame 56 which is pivotally mounted on a horizontal shaft 57 carried on stationarily-fixed supports 58. The frame 56 is positionally controlled by means of two jacks 59 which are pivotally mounted on a pin 61, said pin being carried by a cradle 62. The frame 56 is provided with a stop 63 which is adapted to cooperate with a stop 64 of the cradle 62 in order to maintain the frame in a horizontal bearing position when the jacks 59 are suitably withdrawn.

The frame 56 is provided with a set of endless chains 65 which are mounted between sprocket 66, 67. Said sprockets are keyed on a driving shaft which is coaxial with the shaft 57 and driven by a motor 68 of the frame 56.

Each endless chain 65 which is subjected to a tension-regulating system (not shown in the FIG.) is adapted to carry a series of carriages 69 fitted with runner-wheels 71 which, in the straight portion of the chain 65, are applied against guide-bars 72. The carriages 69 are additionally provided with rubber-covered wheels 73, the axes of which are parallel to the line of maximum slope of the table $C_1$. The carriages 69 are in uniformly spaced relation. There is disposed in the line of extension of the tangent plane which is common to the wheels 73 a device which is intended to displace the glass plate in forward motion and which comprises cleats 53 carried by an endless chain 52 mounted between sprocket-type pulleys 54 as in the case of the table 51. The chains 52 are guided in translational motion by means of bars 60.

There are also mounted on the frame 56 suction cups 75 which are connected to a vacuum source (not shown in the FIG.) and carried by moving supports whereby said suction cups can be moved at will either towards the bearing surface formed by the tangent plane which is common to the rubber-covered wheels 73 or away from said bearing surface.

As a safety measure, provision is made on the side of the table $C_1$ for a series of spaced stops 70 which prevent any accidental overtravel of the glass plate 1 from the corresponding reference position. Provision is also made for a feeler 80 which has the intended function of indicating the presence of a plate 1 in the position of abutment.

So far as the conveyor D is concerned, said conveyor is constituted by a frame 76 comprising a series of rollers 77 having parallel axes and covered with spaced sleeves 78 formed of natural or synthetic rubber and serving to displace the plate 1 without sliding. The rollers 77 are driven in rotation from a motor 79 by means of a suitable transmission system.

The upper tangent plane which is common to the rollers 77 corresponds to the upper tangent plane which is common to the wheels 73 when the frame 56 of the table $C_1$ is placed in the horizontal position.

The operation of this first subassembly is as follows: the glass plate 1 is displaced along the bay $A_1$, $A_2$ in a driven motion which is imparted by the cleats 53 of the chains 52 after the table 51 has been brought to a suitable level in the event that this should prove necessary.

During this displacement, the plate 1 bears on the wheels 55, then on the wheels 73 of the carriages 69, thereby ensuring its displacement while subjecting the chains 52 to only a small value of tension.

When the feeler 80 is actuated, the edge of the plate 1 having been applied against the stops 70, the suction cups 75 are moved forward until they come into contact with the corresponding face of the plate 1 and a vacuum is applied to said suction cups in order to maintain the plate 1 firmly in position.

The jacks 59 are then withdrawn and drive the frame 56 in rotation about the shaft 57 in the direction of the arrow T. During this movement, the plate 1 is retained by the suction cups 75 and is therefore not liable to be dislodged. When the frame 56 has reached the horizontal position, and since the stops 63 and 64 are applied against each other, the suction cups 75 are again moved away from the plate 1 after being restored to atmospheric pressure. The motor 68 is then started up, the chains 65 consequently displace the carriages 69 and the runner-wheels 71 run along the guide bars 72. The corresponding displacement of the wheels 73 initiates the translational motion of the plate 1 in the direction of the arrow U. Since the motor 79 has already been started up as mentioned earlier, the plate 1 is taken by the rollers 77 of the conveyor D progressively as it leaves the table $C_1$ and transferred onto the conveyor E if the requisite preliminary conditions have been complied with.

The marking gantries H and M are identical in constructional design except for the fact that the length is adapted to the horizontal dimensions of the glass plates. Only one gantry such as, for example, the gantry H will therefore be described hereunder.

Said gantry comprises essentially two stationary bases 81 (as shown in FIGS. 7 to 9) which are placed on each side of the conveyor E and in parallel relation to this latter. Each base 81 serves as a support for a movable box structure 82 which is essentially constituted by an assembly of parallel tool-carrier beams 83. The vertical displacement of the box structure 82 relative to the bases 81 is carried out by means of a lifting and lowering mechanism 84. Each of these subassemblies will now be described in greater detail.

Each base 81 comprises a concrete block 85, there being mounted on the top surface of said block a steel plate 86 which is fixed in the concrete by means of anchoring bolts 87. The plate 86 defines the reference level of the gantry H. A cast-iron base-plate 88 is screwed onto said plate 86. The top face of the base-plate 88 is planed and provided with lateral lugs 89 fitted with clamping screws 91 which are intended to provide accurate position-setting of a plate 92 which serves as a stationary pedestal for the box structure 82. The plate 92 is fitted at each end with two superposed sleeves 93, 94, the sleeve 94 being of the ball-mounted type. A guide column 95 is adapted to penetrate into the sleeve 94 and is inserted through two oppositely-mounted U-section members 96, 97 which extend transversely to the tool-carrier beams 83, thus clamping the ends of said beams 83. The columns 95 are fixed in position by means of nuts 98, 99. The nut 98 tends to apply an annular shoulder 101 of the column 95 against a crosspiece 102 which provides a junction between the two flanges of the U-section member 96. The nut 99 tends to apply the U-section member 97 against the tool-carrier beams 83.

Each tool-carrier beam 83 consists of an I-beam with fully machined flanges. The box structure which is formed by the assembly of beams 83 and U-section members 96, 97 is further strengthened by closure plates 103 which join the beams 83 to the U-section members 96, 97 and by a series of gussets which are not shown in the drawings.

In the utilization position, the ends of the columns 95 are engaged within the sleeves 93, 94 and bear on powerful springs 104 which are housed within said sleeves. The mechanical characteristics of the springs 104 are such that they balance approximately three-quarters of the load applied by the box structure 82 which is assumed to be provided with the full complement of tool units.

Figure 10:
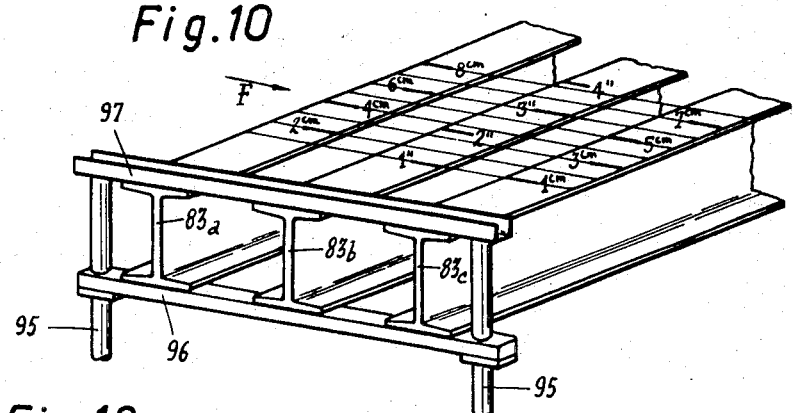
FIG. 10 is another perspective diagram of a portion of the gantry showing the positioning of the marking tools.

In the embodiment under consideration, the box structure 82 consists of three parallel tool-carrier beams 83a, 83b, 83c, as shown in FIG. 10. A row of uniformly spaced marking-tool units 18 is disposed on each side of each beam 83. The pitch of the tool units of a same row is constant and said pitch is the same in the case of each row. Thus, in the arrangement considered, the beam 83a advantageously carries on its upstream face (relative to the direction of the arrow F) tool units which are located at intervals of $4n$ cm., where $n$ is a whole number (namely at measured distances 4, 8, etc.). On the downstream face, the tool units 18 are located at intervals of $(4n+2)$ cm. (measured distances of 2, 6, etc.). In addition, the beam 83c is adapted to carry on its upstream face tool units which are located at intervals of $(4n+1)$ cm. (measured distances of 1, 5, etc.) and on its downstream face tool units which are located at intervals of $(4n+3)$ cm. (distances of 3, 7, etc.). Finally, the central beam 83b can correspond to a subdivision in inches, the upstream face thereof being adapted to carry the tool units which are located at even-number distances (2, 4, etc.) in inches whilst the downstream face carries tool units corresponding to odd-number distances 1, 3 and so forth. It is thus apparent that the assembly of tool units carried by the beams 83a and 83c makes it possible to mark a series of lines $a$ which have a relative spacing of only 1 cm.

The tool units 18 which are employed for the marking operation are preferably in accordance both in structural design and in the method of attachment to the beams 83 with the units described in French Pat. No. 1,526,313, issued on Apr. 16, 1968.

A tool unit of this type is shown very diagrammatically in FIG. 11 and only a brief description will now follow. The tool unit comprises a support 111 which is removably mounted in the beam 83. With this objective, the beam is provided at the upper end with a toothed rule 112 which permits the engagement of a rib 113 of the support 111. The beam 83 is also provided with a yoke 114 for securing a hook 115 which is pivotally mounted on the support 111.

The bottom flange 116 of the beam 83 is fitted at the lower edge with a notched rule 117 on which are mounted trapezoidal lugs 118 bridged by yokes 119 of the support 111. The front portion of said support is provided with a pivot-pin 121 for a rocker-arm 122 and a lever-arm 123 which is adapted to carry the marking-wheel 124.

The rocker-arm 122 is controlled in angular motion by an electromagnet 125. When said electromagnet is energized, the marking-wheel is brought into contact with the glass plate 1 and carries out a marking operation. When the current which energizes the electromagnet 125 is cut off, springs such as the spring 126 return the rocker-arm 122 to a rest position in which the marking-wheel 124 is located above the plate 1. Current is supplied to the series of electromagnets 125 by means of separate lead-wires 127 which are protected by a sheath 128 extending along the web of the beam 83.

The lifting and lowering mechanism 84 comprises a motor 131 which drives a mechanical reduction-gear unit 132 having two output shafts 133. Said shafts in turn drive on each side by means of rods 134 and cardan-type couplings 135, 136 a reduction-gear unit 137 which forms a bevel-gear drive system and is mounted on the pedestal plate 92. The output shaft 138 of the reduction-gear unit 137 drives through a coupling 139 (shown in FIG. 9) a shaft 141 housed in a casing 142 placed vertically below the central beam 83b of the box structure 82. The shaft 141 is adapted to carry a cam 143 constituted by an eccentric. A runner-wheel 144 mounted in a yoke 145 which is secured to the lower U-section member 96 of the box structure 82 is adapted to bear on the rolling surface of the cam 143. The runner-wheel 144 penetrates into the casing 142 by means of a recess formed at the upper end of this latter. A bellows seal 146 provides a leaktight connection between the casing 142 and the U-section member 96.

When the cam 143 is in the bottom position as shown in FIGS. 8 and 9, the crosspieces 102 are applied against the ends of the sleeves 94: the gantry H is in the bottom position.

The transmission of motion between the motor 131 and the two cams 143 is such that these latter rotate in opposite directions; upward motion takes place in the inward direction and downward motion takes place in the outward direction as shown by the arrow V in FIG. 8. Under these conditions, the tangential couples generated during the upward or downward motion of the gantry counteract each other. This arrangement reduces to a minimum any possible displacements of the gantries in the horizontal plane as well as stresses on the guide columns 95.

In order to maintain the box structure 82 at the desired level, provision is additionally made for a set of packing-pieces 151 (as shown in FIG. 12), each packing-piece being constituted by a handle 152 and by a fork 153 of calibrated thickness. Said packing-pieces 151 are intended to be inserted around the columns 95 between the sleeves 94 and the crosspieces 102.

It is understood that, in order to bring the box structure 82 to the desired level, said structure is first moved to the maximum height by means of the cams 143 which have moved to the top position, whereupon the packing-pieces 151 are inserted around the columns 95 and the box structure is allowed to return downwards until the crosspieces 102 come into abutment with the forks 153 of the aforesaid packing-pieces. It is thus ensured that the box structure 82 has in fact reached the desired level.

Provision is advantageously made for a limit switch controlled by a cam which is associated, for example, with the shaft 141 and which ensures automatic stoppage of the motor 131 when the box structure 82 has reached either the top or the bottom position.

The motor 131 can be controlled in parallel by means of a pushbutton box which is placed at the disposal of the operator and by means of a feeler (not shown in the FIG.) which is placed above the conveyor E and which initiates the automatic upward movement of the box structure 82 in the event that the thickness of the glass were to exceed permissible dimensions, provision being made for the possibility of rearward angular displacement of the lever-arms 123 which carry the marking-wheels 124.

It is apparent that provision is made for means whereby any expansion resulting from possible changes of temperature is prevented from giving rise to dispersed errors. To this end, the plate 88 of the base 81 which is located on the side opposite to the origins of the divisions is accordingly provided with means for permitting the possibility of translational motion of the pedestal plate 92.

In order to provide maximum accuracy in marking, care must be taken during construction of the gantry to ensure that the horizontal plane formed by the vertices of the guide sleeves 94 is defined with maximum precision. Sag resulting from bending of the tool-carrier beams 83 must be limited to a minimum. The box structure 82 is also made as nondeformable as possible.

The invention results in particular in the following advantages:

A high speed of operation. It can accordingly be mentioned by way of indication that, with the operating capacity of an actual installation in accordance with the invention, it is possible to process one glass plate measuring 5.20 m. × 3.35 m. per minute. This high output is made possible primarily by virtue of the fact that the marking-tool units 18 are stationarily mounted on the gantries H and M whereas the glass plate progresses beneath said tool units. The units do not therefore need to be displaced when the cutting layout is modified from one plate to another. The glass plates can thus be processed at a perfectly uniform rate since no mechanical movement other than the lifting and lowering of the electrically-operated marking-wheels is necessary.

The arrangement provided for the gantries H and M also makes it possible to mark a very large number of parallel lines on a glass plate; an optimum layout calculated by the computer in the case of one glass plate does not therefore need to be abandoned by reason of an insufficient number of cutting-tool units which are capable of working simultaneously.

The fixed position of the cutting-tool units 18 on the tool gantries H and M and the lateral fixity of said gantries with respect to the ground as well as the arrangements made for adjusting the positions of the tool units, the structural makeup of the gantries and the displacements of the glass plate all serve to permit a marking accuracy of ±1 mm., which is a remarkable result.

Finally, it will be noted that in the case of marking operations proper, the glass plates are automatically brought into position with respect to the marking-tool units, then discharged on completion of the marking operation.

Referring to FIGS. 13 to 18, there will now be described a particular form of construction of the table K for changing the direction of the glass plates 1.

The table K comprises essentially a stationary frame 161 formed by a suitably braced support structure supported on the ground by means of struts 163. The frame 162 supports an assembly of longitudinal members 164, 165 which are parallel to each other and parallel to the intended direction G of displacement of the glass plates 1.

Figure 16:
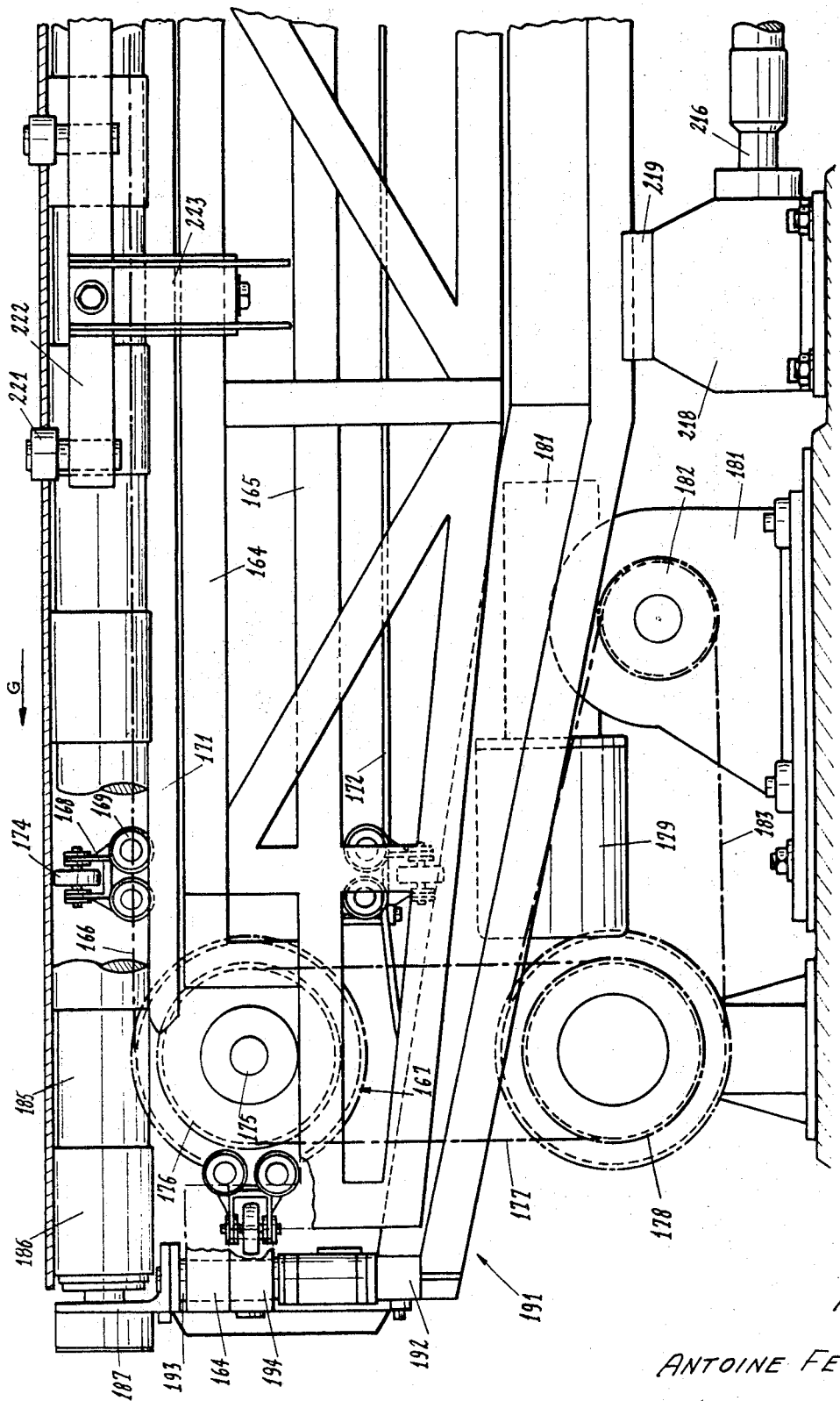
FIG. 16 is an enlarged elevation view of the broken-away portion of FIG. 15, the table being shown in the top position.

The frame 161 carries the system for producing the displacement of the plates 1 in the direction of the arrow G. Said system comprises in the same manner as the tilting tables $C_1$, $C_2$ a series of endless chains 166 extending parallel to the direction G and mounted between guide sprockets 167. Each chain 166 serves to drive a series of uniformly-spaced carriages 168 each fitted with four flanged runner-wheels 169 (as shown in FIGS. 16 and 17), said runner-wheels being applied against rails 171, 172 which are carried by longitudinal members 164, 165. The ends of the rails 171, 172 are curved upwards and extend to the vicinity of the driving sprockets 167. Each carriage 168 is fitted with a nonskid wheel 174, the axis of which is parallel to the direction of the arrow G when the carriage 168 is located in the rectilineal portion of its travel. The tangent plane which is common to all the wheels 174 when they bear on the rail 171 corresponds to the tangent plane which is common to the driving rollers of the conveyor E.

The guide sprockets 167 which are located on one side of the frame 161 are mounted on a driving shaft 175 which carries two driving sprockets 176. Said sprockets are connected by means of a chain-drive system 177 to two other sprockets 178 which are driven in rotation by a motor 179 through a reduction-gear unit 181 with tangent screw, the output sprocket 182 of which drives a chain 183 which is adapted to engage with a double sprocket 180, said double sprocket being keyed to a shaft 190 which carries the sprockets 178. The other guide sprocket 167 of the chains 166 is subjected to the action of a chain-tensioning device 184 (as shown in FIG. 13).

Between the series of chains 66, the table K additionally comprises a set of rollers 185, the axes of which are parallel to the direction of the arrow G and which are fitted with sleeves 186 of nonskid material (such as neoprene rubber, for example). The rollers 185 are carried at their ends by right-angled brackets 187 and in their central portions by a bearing 188 (as shown in FIG. 13).

The right-angled brackets 187 and the bearing 188 form part of a vertically moving frame 191. The frame 191, which is shown in FIGS. 13 and 14 by means of thickly dotted portions for the sake of enhanced clarity and in order to distinguish the stationary frame 161, essentially comprises a cradle 192 which carries a series of sliding rods 193, said rods being joined to the brackets 187. The rods 193 are slidably mounted in guide-collars 194 which form part of the stationary frame 161 and are attached to the longitudinal members 164 and 165 of said frame as can be seen from FIG. 17. In addition, the central bearings 188 of the rollers 185 are carried by upright members 196 which are joined to the cradle 192.

The complete assembly of rollers 185 is driven in rotation from a motor 201 which is followed by a tangent-screw reduction-gear unit 202, the output shaft of which carries a sprocket 203 in meshing relation with a chain 204, said chain being adapted to engage with a double sprocket 205 carried by a stationary support 210. The sprocket 205 drives by means of a chain 206 a receiving sprocket 207 which is rigidly fixed to the first roller 185. The movement of rotation is transmitted from the sprocket 207 to all the other rollers 185 by means of a series of endless chains 208 and double sprockets 209 (as shown in FIG. 15).

By reason of the vertical displacement to which the moving frame 191 is subjected, the chain 206 is provided with a system of tensioning units 211 which are controlled by screw jacks 212a and intended to maintain the chain 206 under suitable tension when the frame 191 is in the bottom position.

Figure 18:
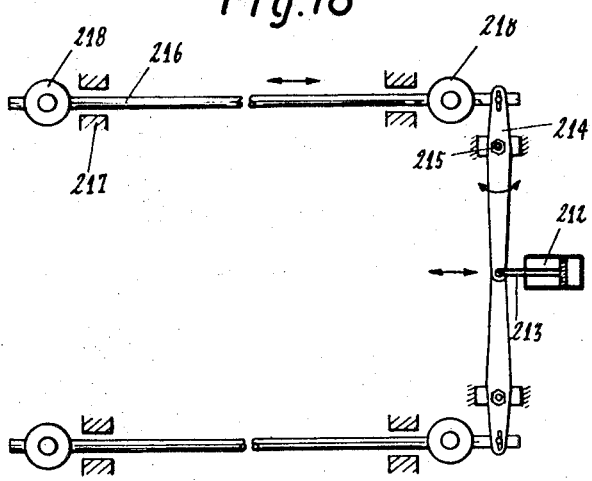
FIG. 18 is a plan diagram showing the device for lifting and lowering the table.

A lifting and lowering mechanism is associated with the moving frame 191 which is thus guided in vertical sliding motion by the assembly of rods 193 which are slidably mounted in the collars 194. As shown in FIG. 18, said lifting and lowering mechanism comprises a single jack 212 which may be of the hydraulic type, for example. The sliding rod 213 of said jack is adapted to actuate by means of link-arms 214 which are pivoted about the pin 215 two parallel connecting-rods 216 which are slidably mounted in guide blocks 217. The connecting-rods 216 each pass through two lifting jacks 218 of a type which is known per se and the vertically-sliding operating rods 219 of which support the base of the frame 191. The table K thus has four uniformly spaced lifting jacks 218 which support the entire moving frame 191.

The height-adjustment of said frame 191 is such that, in the top position, the tangent plane which is common to the sleeves 186 of the rollers 185 coincides with the tangent frame which is common to the wheels 174 of the carriages 168.

The equipment of the table K is further completed by an assembly of runner-wheels 221 having vertical axes and mounted on a longitudinal member 222 carried on the stationary frame 161 by connecting brackets 223. The runner-wheels 221 are placed on the downstream side of the frame relative to the direction of the arrow F. Said wheels determine the limit of forward motion of the glass plate 1 in the direction F.

The operation of the table K as thus designed and arranged is as follows: when the motor 201 is in operation and the frame 191 is in the top position, and when a glass plate 1 is brought into position by the conveyor E, said plate comes onto the sleeves 186 of the rollers 185 which are driven by the above-described drive system and in particular by the chains 206 and 208. Said rollers thus effect the propulsion of the plate 1 in the direction F. At the same time, the plate bears on the wheels 174 of the carriages 168 which thus play a contributory role in supporting and guiding said plate since they are located at the same level as the sleeves 186.

At a given moment, the feeler 30 initiates the stopping of the motor 201. Said motor is preferably not provided with any braking system inasmuch as the glass plates 1 stop by inertia and the timing is so regulated that a plate 1 attains zero speed as it comes into contact with the stop-wheels 221.

The jack 212 of the lifting and lowering mechanism is then actuated and, by exerting a tractive force on the connecting-rods 216, initiates the downward motion of the moving frame 191, the rods 193 of which accordingly slide within the collars 194. At this moment, the glass plate 1 is resting only on the wheels 174. The motor 179 is then started up and, especially through the intermediary of the chains 183, 177 and the shaft 175, drives the series of chains 166 which actuate the carriages 168. Said carriages are then driven in synchronism in the direction of the arrow G and therefore in the direction parallel to the axes of the wheels 174, thereby carrying out the translational movement of the plate 1 until the downstream end of this latter relative to the direction G reaches the conveyor N. Said conveyor thus contributes to the forward motion of the glass plate 1.

It has been shown by experience that the combined assembly of means thus provided would make it possible to return the glass plate 1 in a direction which is strictly at right angles to the direction of arrival, provided that the construction of the table K is suitably carried out. The possibility of obtaining such a result at an industrial level of development had not hitherto proved evident. However, this essential requirement of orthogonal transfer sets a practical value on the method according to the invention.

Figure 19:
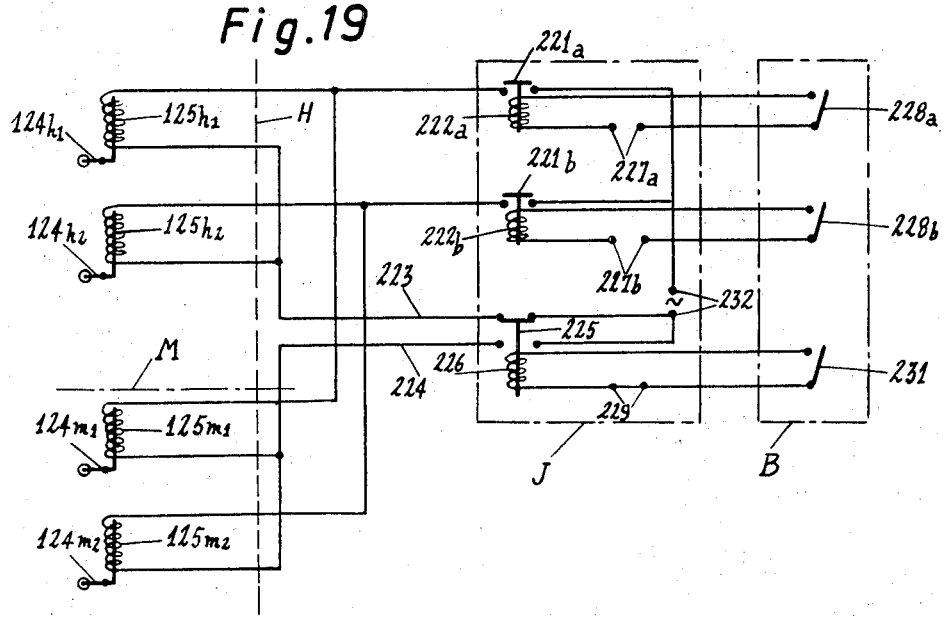
FIG. 19 is a diagram of electrical connections between the computer and a marking gantry.

There is shown in FIG. 19 one mode of execution of the selective control of the tool units 18 which are carried by the gantries H.

More specifically, there are shown diagrammatically at $124h_1$ and $124h_2$ two marking-wheels forming part of two consecutive tool units of the gantry H. Similarly, the references $124m_1$ and $124m_2$ designate two marking-wheels which form part of two consecutive tool units 18 of the gantry M.

The electromagnets $125h_1$ and $125m_1$ which control respectively the marking-wheels $124h_1$ and $124m_1$ are supplied in parallel from the make contact 221a of a control relay 222a. Similarly, the windings $125h_2$ and $125m_2$ of the electromagnets which control the marking-wheels $124h_2$ and $124m_2$ are supplied with current through the make contact 221b of a relay 222b and so on in sequence, the different windings 125 being supplied in pairs from a relay 222 which forms part of the control cubicle J.

On the other hand, all the return circuits of the windings $125h_1$, $125h_2$, etc., of a same gantry are connected in parallel to a common lead-wire 223; similarly, the return circuits of the windings $125m_1$ and $125m_2$, etc., are connected in parallel to a return lead-wire 224. The lead-wires 223 and 224 terminate in a reversing switch 225 which is controlled by a relay 226.

The relays 222a, 222b, etc., of the control cubicle J each form part of a circuit which is supplied from a low-voltage source (terminals 227a, 227b) and are connected to a contact 228a, 228b, etc., which is electronically maintained and forms part of the digital computer B. Similarly, the relay 226 which is connected to the low-voltage source through the terminals 229 is controlled by a contact 231 of the computer B.

The relays 222 and the relay 226, for example, can be supplied at 12 volts whilst the various windings 125 can be supplied with alternating current at 220 V from terminals 232 which are respectively connected to the reversing switch 225 and to the set of contacts 221a, 222b, etc., of the relays.

The operation of the tool-control system is as follows: as the program of the computer B takes place, the contacts 228a, 228b, etc., can be selectively closed and opened. This control operation can be performed in groups of sixteen contacts, for example, at a maximum rate of one group every two microseconds, these values being given solely by way of indication. When the contact 228a is closed, the 222a is energized and closes the contact 221a. The winding $125h_1$ or $125m_1$ is then energized according as the changeover relay 226 is at rest (case of FIG. 19) or energized.

It is thus apparent that tool units 18 both of the gantry H and of the gantry M can be put into operation at the same time, thereby achieving complete reliability. By virtue of this control system, the number of control relays of the cubicle 23 can be divided approximately by 2 and considerable simplification is introduced in the circuits which connect the control cubicle to the computer B.

When the marking program is carried out on the glass plates in the direction H, the contact 231 is opened and the contacts 228a, 228b, etc., which are controlled selectively by the program initiate the energization of the corresponding relays 222a, 222b, etc., and the operation of the corresponding marking-wheels $124h_1$, $124h_2$, etc. The energization of the relay 226 makes it possible to cut off the supplies to all the winding $125h$ of the gantry H and, on the contrary, to energize selectively the windings $125m$ of the gantry M by virtue of the changeover of the return circuits of the relays 222a, 222b etc., by means of the reversing switch 225.

Figure 20:
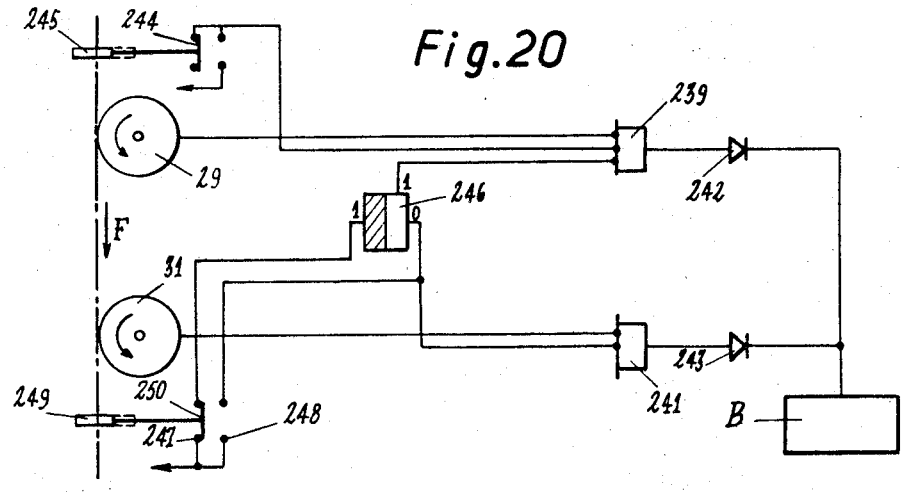
FIG. 20 is circuit diagram showing the connections of the coders.

FIG. 20 shows a preferred construction of a static device for carrying out the automatic switching of the coders 29 and 31 of a same cutting gantry. This circuit arrangement is intended to prevent pulses derived from the coders from being lost or, conversely, certain pulses from being transmitted simultaneously from each coder to the computer. The coders 29 and 31 are respectively connected to one of the inputs of two AND gates 239 and 241 which are connected in parallel to the computer B through rectifiers 242, 243.

The gate 239 has three inputs and its second input is connected to the make contacts and break contacts of a switch 244, said switch being controlled by a feeler 245 which is disposed upstream of the coder 29 relative to the direction of motion of the glass plates 1 which is indicated by the arrow F.

The third input of the gate 239 is connected to the output of a bistable storage device 246, the inputs of which are respectively connected to the break contacts 247 and make contacts 248 of another switch 250, said switch being actuated by a feeler 249 which is located downstream of the coder 31 relative to the direction F. The make contacts 244, 247 and 248 are connected to a source having the level 1. Thus, the storage device 246 is such that its input which is connected to the contact 247 is in state 1 whereas the input which is connected to the contact 248 is in state 0. In this state, the output of the memory device 246 which is connected to the gate 239 is at level 1.

At the outset, the coders 29 and 31 are at a standstill, the make contact of the switch 224 is open and the contact 247 is closed. The input 2 of the gate 239 is at level 0 and the input 3 is at level 1. No pulse which may be delivered by the coder 29 can therefore be transmitted to the computer B. Similarly, the input 2 of the gate 241 is at level 0 and no pulse can be transmitted by the coder 31.

When a glass plate 1 comes into position, the feeler 245 is actuated and the switch 244 closes its make contact. The input 2 of the gate 239 changes to level 1 and pulses can then be transmitted by the coder 29 as soon as this latter is set in rotation as a result of the forward motion of the glass plate.

The coder 31 is then set in rotation by said glass plate but no pulse is transmitted through the gate 241 whose input 2 is at level 0. On the other hand, as soon as the feeler 249 is actuated, there takes place a changeover of the contacts 247 and 248 and consequently of the levels at the two input terminals of the storage device 246. The input 2 of the gate 241 therefore changes to level 1 whilst the input 3 of the gate 239 changes to level 0. At the same time, the pulses derived from the coder 29 are therefore blocked whereas the pulses derived from the coder 31 are transmitted to the computer B.

When the glass plate has passed beyond the feeler 249, the device reverts to its initial state. It is therefore ensured that no spurious pulse is transmitted to the computer.

I claim:

1. A process for cutting glass into sheets in order to obtain rectangular panes of commercial dimensions and comprising the preparation of a marking layout by means of an electronic computer which receives data relating to customers' specifications, characterized in that an automatic marking operation is carried out on each sheet of glass in accordance with a complete T-layout in which the T crossbars are parallel either to one or the other of two orthogonal directions, said marking operation being carried out continuously by displacement of th glass sheet in one of said directions and correlative incision of all the lines which are parallel to said direction followed by displacement of the same sheet in the orthogonal direction and correlative incision of all the lines which are parallel to said second direction followed by cracking of the glass which has thus been completely incised.

2. A process in accordance with claim 1, characterized in that the electronic computer also receives data relating to the geographical location of flaws in the sheet of glass.

3. A device for cutting glass into sheets in order to obtain rectangular panes of commercial dimensions and comprising a conveyor for the glass sheets, a set of marking tools disposed above said conveyor and controlled selectively by an electronic computer which receives data relating to the cutting operation and establishes the cutting layout, and a system for cracking the glass, characterized in that it comprises two stationary gantries adapted to carry the marking-tool units and disposed above two sections of the conveyor which extend in directions at right angles to each other, a direction-changing table which serves to convey the glass sheets at right angles and arranged between the two marking gantries and that the glass-cracking system is disposed downstream of the second cutting gantry relative to the direction of displacement of the glass sheets.

4. A device in accordance with claim 3, characterized in that the marking gantry comprises at least one beam disposed above the conveyor and adapted to extend at right angles thereto, said beam being adjustable for height and adapted to carry at least one row of marking-tool units.

5. A device in accordance with claim 4, characterized in that the marking-tool units are uniformly spaced along the beam with a constant pitch and that each tool unit is adapted to carry a glass-incising component and electromagnetic means for initiating the operation of said component.

6. A device in accordance with claim 5, characterized in that it comprises a plurality of parallel beams each adapted to carry one row of marking-tool units, said units being disposed with the same pitch from one beam to the other but in staggered positional relation in such a manner that the complete assembly of tool units of the different beams covers all the divisions of a numeral length scale.

7. A device in accordance with claim 4, characterized in that the marking gantry comprises a plurality of parallel tool-carrier beams so arranged as to constitute a rigid box structure which supports vertical guide columns, said columns being slidably mounted within sleeves supported on a stationary base which is disposed on each side of the conveyor.

8. A device in accordance with claim 7, characterized in that it comprises means for adjusting the height of the box structure relative to the base, said means consisting of a lifting and lowering mechanism which is capable of lifting the box structure and a set of removable packing-pieces which can be interposed between said box structure and said base.

9. A device in accordance with claim 4, characterized in that the direction-changing table comprises a system of driving rollers having axes located at right angles to the direction of forward motion of the glass and rows of carrying-wheels which are placed between the driving rollers and the axes of which are parallel thereto, said carrying-wheels being mounted on carriages which are capable of displacement in translational motion at right angles to the aforesaid direction of forward motion of the glass, means being further provided for lowering the system of driving rollers and for driving said carriages in translational motion in order to change the direction of motion of the glass sheet through 90°.

10. A device in accordance with claim 9, characterized in that the driving rollers which are assumed to be in the top position and the carrying-wheels are located in a common tangent plane which defines the level of the glass sheet.

11. A device in accordance with claim 9, characterized in that the system of driving rollers is carried by a vertically-displaceable frame which is adjusted for height by a lifting and lowering mechanism and guided by a stationarily fixed frame which supports the system of carrying-wheel carriages.

12. A device in accordance with claim 11, characterized in that the system of carriages of a same row of carrying-wheels is interconnected by means of an endless chain which is mounted between two guide sprockets, the complete assembly of guide sprockets and endless chains being carried by a same stationary structure which supports a driving shaft, said shaft being passed through all the guide sprockets which are located on one side of the vertically-displaceable frame.

13. A device in accordance with claim 12, characterized in that the support structure of the stationary frame which carries the driving shaft for the carriage-connecting chains is provided with an assembly of longitudinal members disposed between said chains and with collars in which are slidably mounted vertical guide rods carried at one end by the vertically-displaceable frame whilst the other end is adapted to carry a bearing which permits the rotational motion of a driving roller.

14. A device in accordance with claim 11, characterized in that the vertically-displaceable frame which carries the system of driving rollers is supported by four lifting jacks, the movement of extension of which is controlled in synchronism from a single jack by virtue of two sliding rods, each rod being passed through a pair of lifting jacks.

15. A device in accordance with claim 3, characterized in that the tool units of both marking gantries are controlled by electromagnets supplied in parallel through relays which are selectively controlled by the electronic computer, a switching relay which is also controlled by said computer being additionally provided for selectively preventing the energization of either one or the other of the assemblies of control electromagnets which form part of a same marking gantry.

16. A device in accordance with claim 3, characterized in that it comprises on each side of a same marking gantry two coders which are in contact with the glass plate and connected in parallel to the computer through two AND gates each controlled by a system for detecting the passage of the glass plate, a bistable storage device being connected between one of the detection circuits which is assigned to one of the coders and the gate which is assigned to the other coder in order to permit static switching between the coders without either loss or duplication of pulses.